(12) United States Patent
Numata

(10) Patent No.: US 11,516,390 B2
(45) Date of Patent: Nov. 29, 2022

(54) IMAGING APPARATUS AND NON-TRANSITORY STORAGE MEDIUM

(71) Applicant: CANON KABUSHIKI KAISHA, Tokyo (JP)

(72) Inventor: Aihiko Numata, Inagi (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 16/930,952

(22) Filed: Jul. 16, 2020

(65) Prior Publication Data

US 2021/0021759 A1 Jan. 21, 2021

(30) Foreign Application Priority Data

Jul. 17, 2019 (JP) .............................. JP2019-132148

(51) Int. Cl.
*H04N 5/232* (2006.01)
*G06T 3/40* (2006.01)
*H04N 5/225* (2006.01)

(52) U.S. Cl.
CPC ....... *H04N 5/23238* (2013.01); *G06T 3/4038* (2013.01); *H04N 5/2258* (2013.01); *H04N 5/23299* (2018.08)

(58) Field of Classification Search
CPC ........... H04N 5/23245; H04N 5/23299; H04N 5/232933
See application file for complete search history.

(56) References Cited

U.S. PATENT DOCUMENTS

| 6,760,063 B1* | 7/2004 | Kamei | H04N 5/23238 348/333.01 |
|---|---|---|---|
| 7,539,356 B2 | 5/2009 | Igari et al. | |
| 2007/0200933 A1* | 8/2007 | Watanabe | H04N 5/23218 348/E7.086 |
| 2010/0271511 A1* | 10/2010 | Ma | H04N 13/25 382/254 |
| 2016/0088287 A1* | 3/2016 | Sadi | H04N 13/194 348/43 |
| 2018/0167558 A1* | 6/2018 | Hirai | G09G 5/377 |

(Continued)

FOREIGN PATENT DOCUMENTS

JP 2004118786 A 4/2004

OTHER PUBLICATIONS

Notification of the First Office Action issued by the China National Intellectual Property Administration dated Aug. 3, 2022 in corresponding CN Patent Application No. 202010691232.1, with English translation.

*Primary Examiner* — Peet Dhillon
(74) *Attorney, Agent, or Firm* — Carter, DeLuca & Farrell LLP

(57) ABSTRACT

An imaging apparatus that generates a wide-angle image on the basis of images from a plurality of imaging units and is capable of decreasing a likelihood of a subject becoming a double image. The imaging apparatus includes a determination unit configured to determine an imaging range of at least one of a first imaging unit and a second imaging unit on the basis of information relating to a subject designated by a user in a case in which a switching instruction from a non-composition mode to a composition mode and information relating to a subject designated by the user are received from an external device.

20 Claims, 10 Drawing Sheets

(56) References Cited

U.S. PATENT DOCUMENTS

| | | |
|---|---|---|
| 2020/0033701 A1 | 1/2020 | Numata |
| 2020/0098148 A1 | 3/2020 | Numata |
| 2020/0137293 A1 | 4/2020 | Numata |
| 2020/0154087 A1 | 5/2020 | Numata |
| 2020/0294214 A1 | 9/2020 | Numata |
| 2020/0366854 A1 | 11/2020 | Numata |
| 2020/0374469 A1 | 11/2020 | Numata |
| 2020/0396385 A1 | 12/2020 | Numata |

\* cited by examiner

IMAGING APPARATUS AND NON-TRANSITORY STORAGE MEDIUM

BACKGROUND OF THE INVENTION

Field of the Invention

The present invention relates to an imaging apparatus and a storage medium.

Description of the Related Art

In recent years, imaging apparatuses capable of obtaining an image with a capture range larger than that of a case in which a single camera is used (hereinafter, referred to as a wide-angle image) by composing images captured by a plurality of cameras (hereinafter, referred to as a multiple-eye camera) arranged in parallel have been proposed. In Japanese Patent Laid-Open No. 2004-118786, an imaging apparatus that obtains an amount of deviation between a plurality of images by performing a matching process while images captured by multi-eye cameras are shifted and generating a wide-angle image is proposed. In addition, as an imaging apparatus that is used in a case in which a place to be monitored is desired to be changed by a user after installation of an imaging apparatus or the like, an imaging apparatus referred to as a so-called pan-tilt-zoom (PTZ) device that can control an imaging direction of the imaging apparatus has been proposed.

In the imaging apparatus illustrated in Japanese Patent Laid-Open No. 2004-118786, the position of each multi-eye camera is fixed. In contrast to that, by adding a mechanism that controls the imaging direction of each multi-eye camera, a place that is desired to be monitored can be changed by a user. However, as disclosed in Japanese Patent Laid-Open No. 2004-118786, when a wide-angle image is generated from images captured by a multi-eye camera using a matching process, problems as below occur. Generally, an amount of deviation between images captured by multi-eye cameras differs in accordance with a distance from a multi-eye camera to a subject. For this reason, in a case in which a plurality of subjects at different distances are imaged, if a wide-angle image is generated by shifting images such that specific subjects are represented in overlapping images, different subjects may become double images. As a result, the visibility at joining parts of the wide-angle image may deteriorate.

SUMMARY OF THE INVENTION

Thus, the present invention provides an imaging apparatus that generates a wide-angle image on the basis of images from a plurality of imaging units and is capable of decreasing a likelihood of a subject becoming a double image.

In order to solve the problems described above, according to the present invention, there is provided an imaging apparatus that is connected to an external device including a display unit displaying an image used for selecting a composition mode in which a wide-angle image generated using a plurality of captured images captured by a plurality of imaging units is output and a non-composition mode in which the plurality of captured images captured by the plurality of imaging units are individually output, the imaging apparatus including: a first imaging unit and a second imaging unit; a drive mechanism configured to control an imaging range of at least one of the first imaging unit and the second imaging unit; a composition processing unit configured to generate the wide-angle image by composing a first image acquired by the first imaging unit and a second image acquired by the second imaging unit; and a determination unit configured to determine an imaging range of at least one of the first imaging unit and the second imaging unit on the basis of information relating to a subject designated by a user in a case in which a switching instruction from the non-composition mode to the composition mode and the information relating to the subject designated by the user are received from the external device.

Further features of the present invention will become apparent from the following description of exemplary embodiments with reference to the attached drawings.

DESCRIPTION OF THE EMBODIMENTS

Figure 1A:
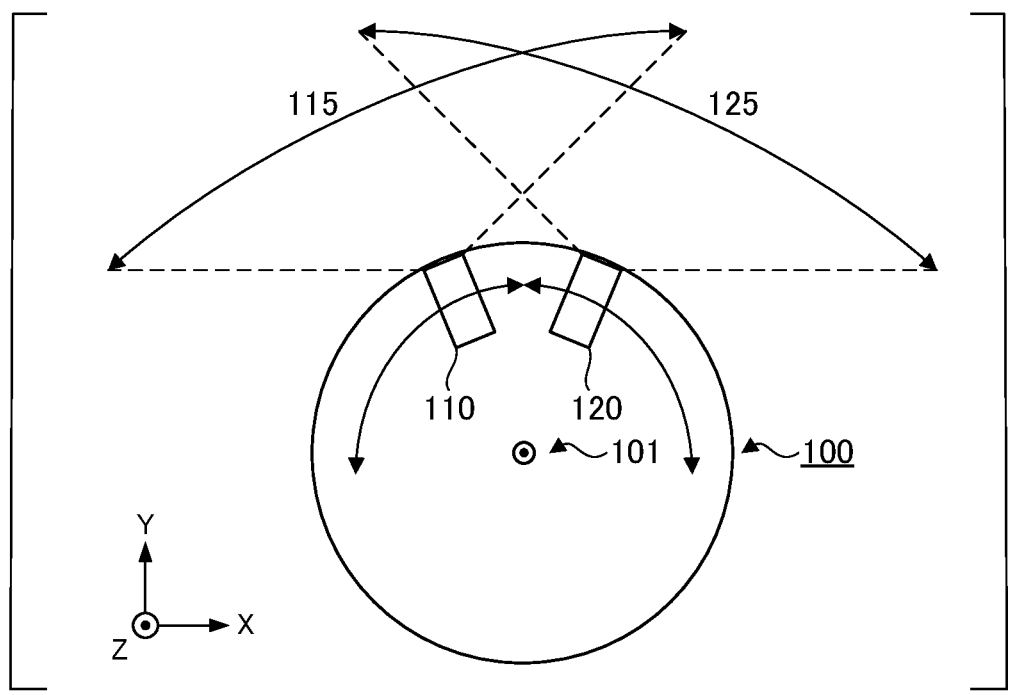
FIGS. 1A and 1B are diagrams illustrating an imaging apparatus according to a first embodiment and a monitoring system using the imaging apparatus.

Hereinafter, imaging apparatuses according to embodiments of the present invention will be described with reference to the drawings. In this regard, the same reference numerals will be assigned to members having the same function, and repetitive description thereof will be omitted. In embodiments, an example applied to a network camera as an imaging apparatus will be described. However, an imaging apparatus is assumed to include electronic apparatuses such as a digital still camera, a digital movie camera, a smartphone with a built-in camera, and a tablet computer with a built-in camera having a plurality of imaging units.

First Embodiment

Figure 1B:
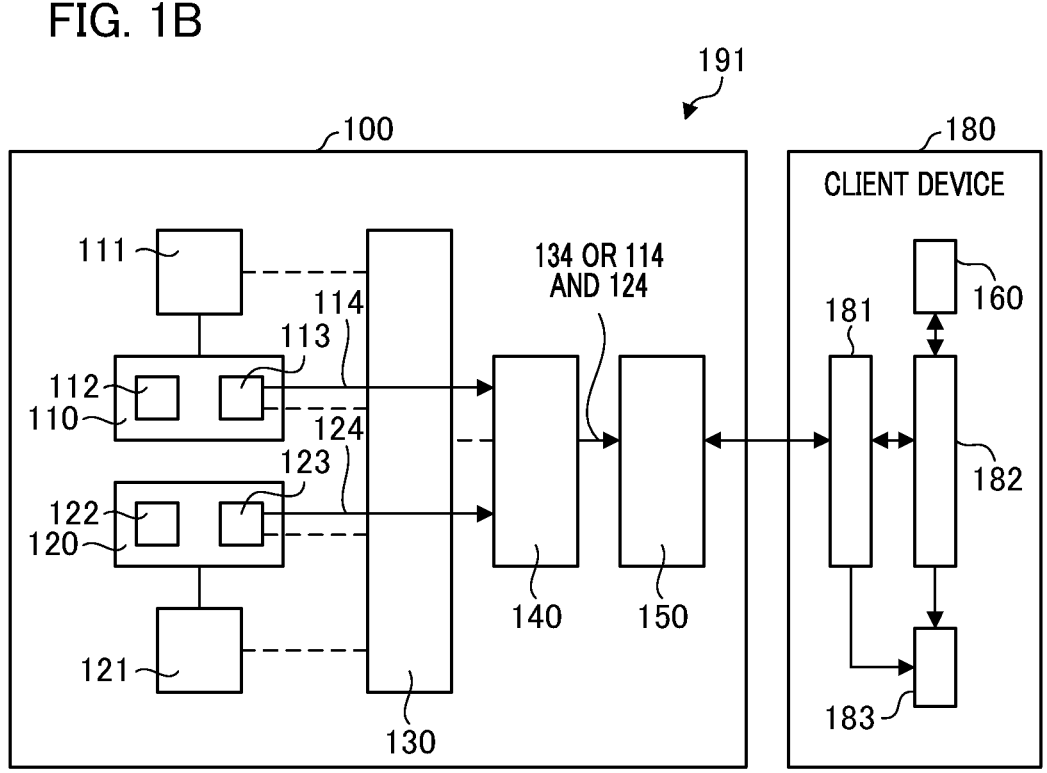

An imaging apparatus 100 according to this embodiment and a monitoring system 191 using the imaging apparatus will be described. FIGS. 1A and 1B are diagrams illustrating the imaging apparatus 100 according to the first embodiment and the monitoring system 191 using the imaging apparatus. FIG. 1A is a layout drawing of the imaging apparatus 100 viewed from an upper side (a +Z axis side). FIG. 1B is a functional block diagram of the inside of the monitoring system 191 that includes the imaging apparatus 100 and a client device 180. The imaging apparatus 100 includes a first imaging unit 110, a second imaging unit 120, a first drive mechanism 111, a second drive mechanism 121, a composition processing unit 140, a control unit 130, and a first transmission/reception unit 150.

The first drive mechanism 111 and the second drive mechanism 121 function as driving means and can respectively control imaging directions of the first imaging unit 110 and the second imaging unit 120 inside the same plane (inside a plane XY). For example, the imaging apparatus 100 according to this embodiment is configured to be able to control an imaging direction in a pan direction (panning direction).

More specifically, as illustrated in FIG. 1B, the first drive mechanism 111 and the second drive mechanism 121 include motors and gears and are configured to be able to respectively rotate the first imaging unit 110 and the second imaging unit 120 around a shaft 101 as a rotation axis by controlling power for driving the motors. The power for driving the motors is controlled by the control unit 130. In other words, the imaging apparatus 100 becomes a drive mechanism that can change an imaging direction of at least one of the first imaging unit 110 and the second imaging unit.

The first imaging unit 110 and the second imaging unit 120 respectively include imaging optical systems 112 and 122 and solid-state imaging devices 113 and 123 such as CMOS image sensors. The first imaging unit 110 and the second imaging unit 120 acquire images by respectively forming subject images on the solid-state imaging devices 113 and 123 through the imaging optical systems 112 and 122. Driving and reading of the solid-state imaging devices 113 and 123 are controlled by the control unit 130. A CPU as a computer is built into the control unit 130, and the control unit 130 functions as a control means that executes various operations of the entire device on the basis of a computer program stored in a memory not illustrated in the drawing.

The composition processing unit 140 functions as a composition processing means and is used for generating a wide-angle image (for example, panorama image) 134 by composing a first image 114 acquired by the first imaging unit 110 and a second image 124 acquired by the second imaging unit 120. More specifically, a wide-angle image 134 may be generated by acquiring an amount of positional deviation between a plurality of images by applying a so-called pattern matching technology of acquiring a correlation coefficient while shifting an overlapping portion of images. In the imaging apparatus 100 according to this embodiment, whether or not a wide-angle image 134 is to be generated by the composition processing unit 140 is selected by a user. The composition processing unit 140 outputs the wide-angle image 134 in a case in which a composition mode is selected and outputs both the first image 114 and the second image 124 in a case in which a non-composition mode is selected.

In a case in which a wide-angle image 134 is not generated by the composition processing unit 140, the composition processing unit 140 transmits the first image 114 and the second image 124 to the first transmission/reception unit 150 without composing the first and second images. In description here, an imaging range represents a range imaged by the imaging unit, and, for example, the imaging range changes in accordance with control of an imaging direction, a zoom magnification, a rotation angle of an imaging plane, and the like.

The first transmission/reception unit 150 transmits images (the first image 114 and the second image 124 or the wide-angle image 134) sent from the composition processing unit 140 to an external client device 180 through a wired network, a wireless network, or the like.

The external client device 180 transmits a command for controlling the imaging apparatus 100 to the first transmission/reception unit 150 through the second transmission/reception unit 181 and a network. The imaging apparatus 100 receives the command and replies to the client device 180 with a response to the command. Here, for example, a command is under control of the first drive mechanism 111 and the second drive mechanism 121. In other words, a user can control directions of the first imaging unit 110 and the second imaging unit 120 through a network from the external client device 180. The client device 180, for example, is an external device such as a PC and includes a user interface 160 by which a user can select a composition mode in which a wide-angle image is displayed or a non-composition mode in which a first image and a second image are independently displayed without generating a wide-angle image. In addition, the client device 180 may include a control unit 182 and a display unit 183.

The control unit 182 controls the inside of the client device 180 and has a computer such as a CPU or the like built thereinto. In addition, the control unit 182 has a memory not illustrated in the drawing built thereinto, and a computer program for controlling the operation of a CPU inside the control unit is stored in the memory. In a case in which switching from the non-composition mode to the composition mode is instructed by the user interface 160, the control unit 182 determines the imaging range of the first imaging unit 110 or the second imaging unit 120 on the basis of the position of a subject of a user's interest. The control unit 182 also functions as a display control means (display control unit) that displays an image including the user interface 160 that is used by a user to select the composition mode or the non-composition mode on the display unit 183. The display unit 183 functions as a display means and is used for displaying an image sent from the imaging apparatus 100 and the like. The user interface 160 includes various switches, a touch panel, and the like. Additionally, the user interface includes graphical user interfaces (GUIs) such as buttons and icons displayed on the display unit 183. A user can give various instructions to the imaging apparatus 100 by operating the user interface 160.

The imaging apparatus 100 according to this embodiment changes generation/non-generation of a wide-angle image in accordance with the composition mode/non-composition mode selected using the user interface 160 and controls imaging directions of the first imaging unit 110 and the second imaging unit 120.

The network is configured by a wired LAN, a wireless LAN, or the like. Power may be configured to be supplied to the imaging apparatus 100 through the network. In this embodiment, although the composition processing unit 140 is disposed inside the imaging apparatus 100, it may be disposed inside the client device 180.

The embodiment illustrated in FIG. 1 illustrates an example in which the imaging apparatus 100 includes the first transmission/reception unit 150 and transmits an image to the client device 180 side and operates in accordance with a command on the client device 180 side. In other words, an example in which the display unit 183, the control unit 182, and the user interface 160 are bodies that are separate from the imaging apparatus is illustrated. However, the imaging apparatus 100 may integrally have a memory storing image data, the display unit 183 displaying an image, and a part of the user interface 160 such as a switch or a touch panel that accepts an instruction from a user. In other words, the imaging apparatus 100 may have the function of the client device 180 integrally embedded therein, and the imaging apparatus according to this embodiment represents a system configuration having the function of the client device 180 integrally or separately.

FIGS. 2A to 2D and FIGS. 3A to 3E are diagrams illustrating examples of relations between the user interface used by a user designating the composition mode/the non-composition mode and imaging directions of the first imaging unit 110 and the second imaging unit 120 in the imaging apparatus 100 according to the first embodiment. Each of circles on the left side of the "composition mode" and the "non-composition mode" in FIGS. 2A to 2D and 3A to 3E represents that the corresponding mode has been selected when the circle is a black circle and represents that the corresponding mode has not been selected when the circle is a white circle.

Figure 2A:
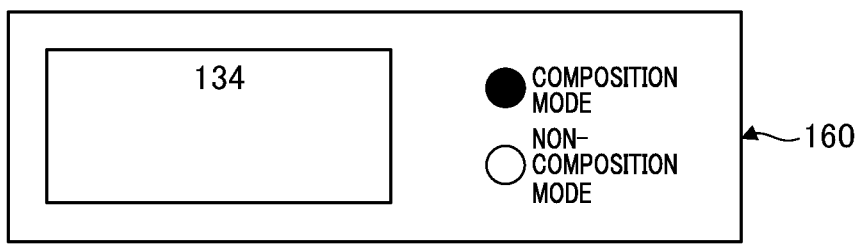
FIGS. 2A to 2D are diagrams illustrating one example of a relationship between a display of a user interface and an imaging direction in the imaging apparatus according to the first embodiment.
Figure 2B:
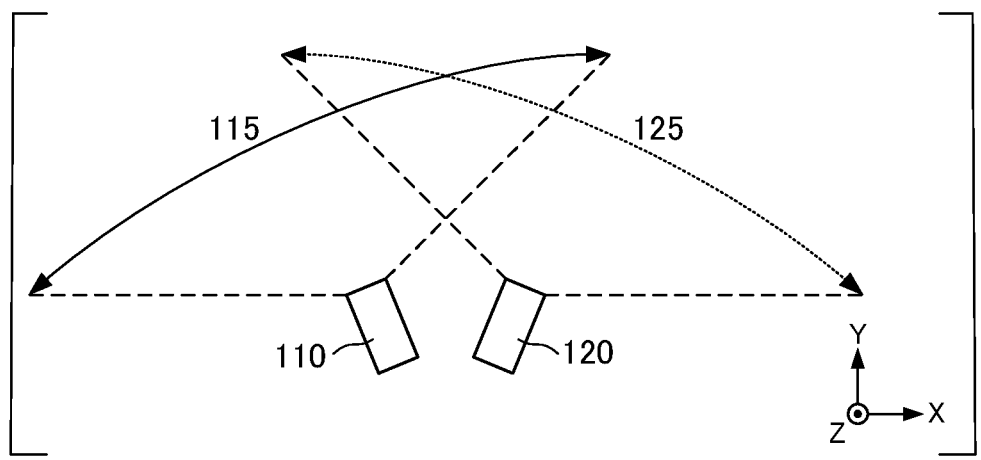

First, a case in which a user switches from the composition mode to the non-composition mode will be described. FIGS. 2A and 2B illustrate a state in which the composition mode has been designed by a user as an initial state. In FIG. 2A, a wide-angle image 134 generated by composing a first image 114 and a second image 124 is displayed in the user interface 160 such as a GUI or the like on the display unit 183. At this time, the first imaging unit 110 and the second imaging unit 120 are assumed to be directed toward imaging directions illustrated in FIG. 2B. FIG. 2B illustrates a first imaging range 115 imaged by the first imaging unit 110 and a second imaging range 125 imaged by the second imaging unit 120. In the drawings, although the first imaging unit 110 and the second imaging unit 120 perform imaging in different directions, parts of the first imaging range 115 and the second imaging range 125 overlap each other.

Figure 2C:
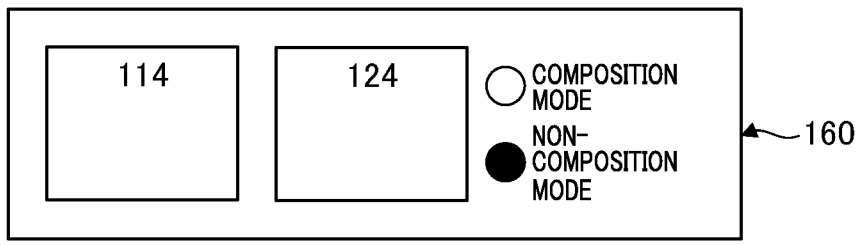
Figure 2D:
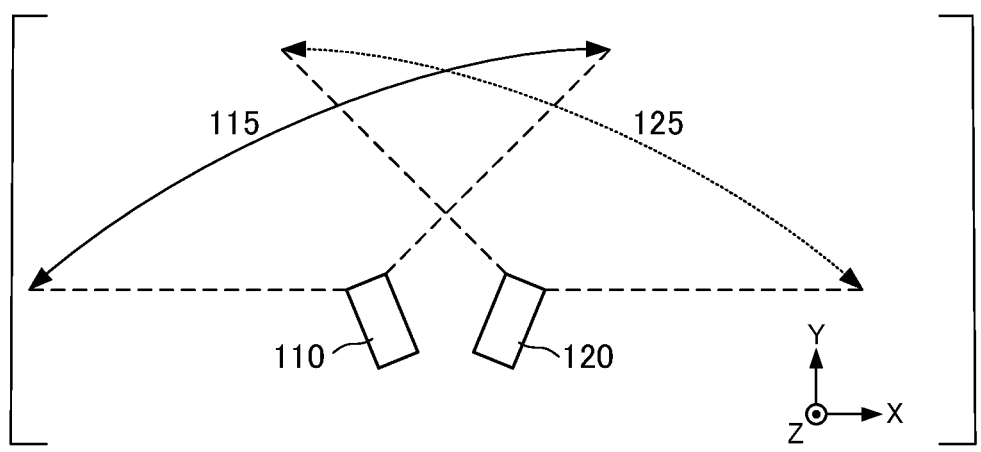

Here, it is assumed that the user instructs switching from the composition mode to the non-composition mode. Then, as illustrated in FIG. 2C, the composition processing unit 140 stops generation of the wide-angle image 134 and independently displays the first image 114 and the second image 124 in the user interface 160. At this time, as illustrated in FIG. 2D, the imaging directions of the first imaging unit 110 and the second imaging unit 120 are maintained as they are. In other words, parts of the first imaging range 115 and the second imaging range 125 are maintained as overlapping each other.

Figure 3B:
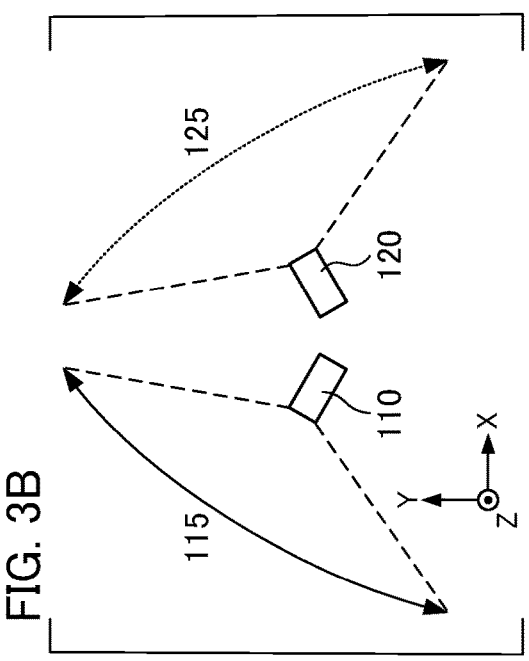
FIGS. 3A to 3E are diagrams illustrating an example of a relationship between display of a user interface and an imaging direction in the imaging apparatus according to the first embodiment.
Figure 3E:
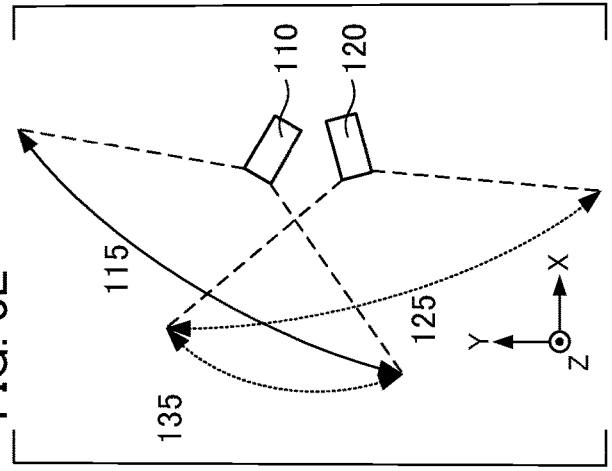

On the other hand, a case in which a user performs switching from the non-composition mode to the composition mode will be described. FIGS. 3A and 3B illustrate a state in which the non-composition mode is designated by the user as an initial state. In FIG. 3A, a first image 114 and a second image 124 are independently displayed in the user interface 160. At this time, the first imaging unit 110 and the second imaging unit 120 are directed in imaging directions illustrated in FIG. 3B. In this drawing, the first imaging unit 110 and the second imaging unit 120 perform imaging in different directions, and a first imaging range 115 and a second imaging range 125 do not overlap each other.

Here, it is assumed that the user instructs switching from the non-composition mode to the composition mode. In addition to this instruction, the user instructs one of the first imaging unit 110 and the second imaging unit 120 to be used as a reference for generating a wide-angle image 134. Hereinafter, as one example, a case in which the first imaging unit 110 is designated as the reference will be described.

Figure 3D:
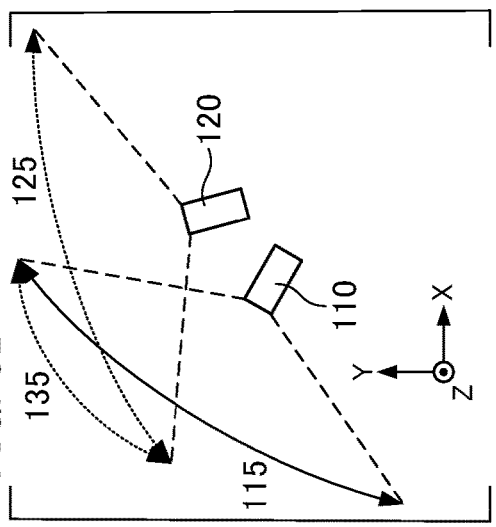
Figure 3A:
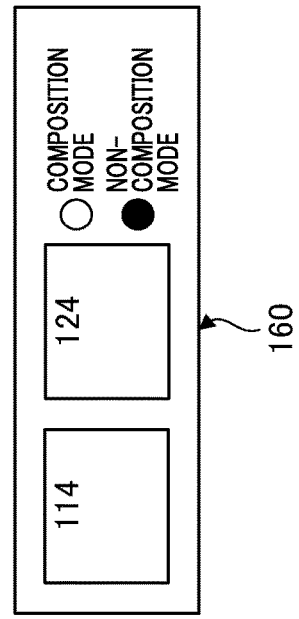
Figure 3C:
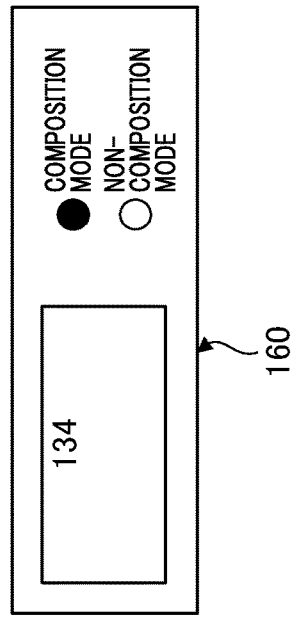

In a case in which the first imaging unit 110 is used as the reference, as illustrated in FIG. 3D, the imaging direction of the second imaging unit 120 is changed. After the change of the imaging direction of the second imaging unit 120 ends, generation of a wide-angle image 134 using the composition processing unit 140 is started. Thereafter, as illustrated in FIG. 3C, the wide-angle image 134 acquired by composing the first image 114 and the second image 124 is displayed in the user interface 160.

As can be understood by comparing FIG. 3B with FIG. 3D, the imaging direction of the first imaging unit 110 is maintained without being changed, and only the imaging direction of the second imaging unit 120 is changed. In addition, as illustrated in FIG. 3E, the imaging direction may be changed such that a relative positional relation between the first imaging unit 110 and the second imaging unit 120 is changed. In other words, a state in which the second imaging unit 120 is positioned in a direction opposite to that of the state illustrated in FIG. 3D is formed. At this time, it is more preferable that the user interface should be formed such that a relative positional relation of the second imaging unit 120 with respect to the first imaging unit 110 can be designated by a user. Although a case in which the first imaging unit 110 is used as the reference has been described above, in a case in which the second imaging unit 120 is used as a reference, it is preferable that the imaging direction of the second imaging unit should be maintained as it is, and the imaging direction of the first imaging unit should be changed such that a wide-angle image 134 can be generated.

By configuring as such, a wide-angle image can be generated while reducing the likelihood a subject of a user's interest becoming a double image. Detailed description of this effect will be presented as below.

First, a method of generating a wide-angle image 134 will be described. In order to generate a wide-angle image 134, it is necessary to acquire an amount of positional deviation between the first image 114 and the second image 124. In order to acquire an amount of positional deviation, a general technique as disclosed in Japanese Patent Laid-Open No. 2004-118786 may be used. For example, while the first image 114 and the second image 124 are shifted from each other, a correlation coefficient such as a sum of squared difference (SSD) or a sum of absolute difference (SAD) is calculated. An amount of positional deviation for which the correlation coefficient is the highest may be acquired.

Accordingly, in a case in which switching from the non-composition mode to the composition mode is instructed by a user, parts of the first imaging range 115 and the second imaging range 125 need to overlap each other. For this reason, in a case in which switching from the non-composition mode to the composition mode is instructed by a user, the imaging direction of at least one of the first imaging unit 110 and the second imaging unit 120 needs to be changed. Hereinafter, a range in which the first imaging range 115 and the second imaging range 125 overlap each other will be referred to as an overlapping range 135.

Figure 4A:
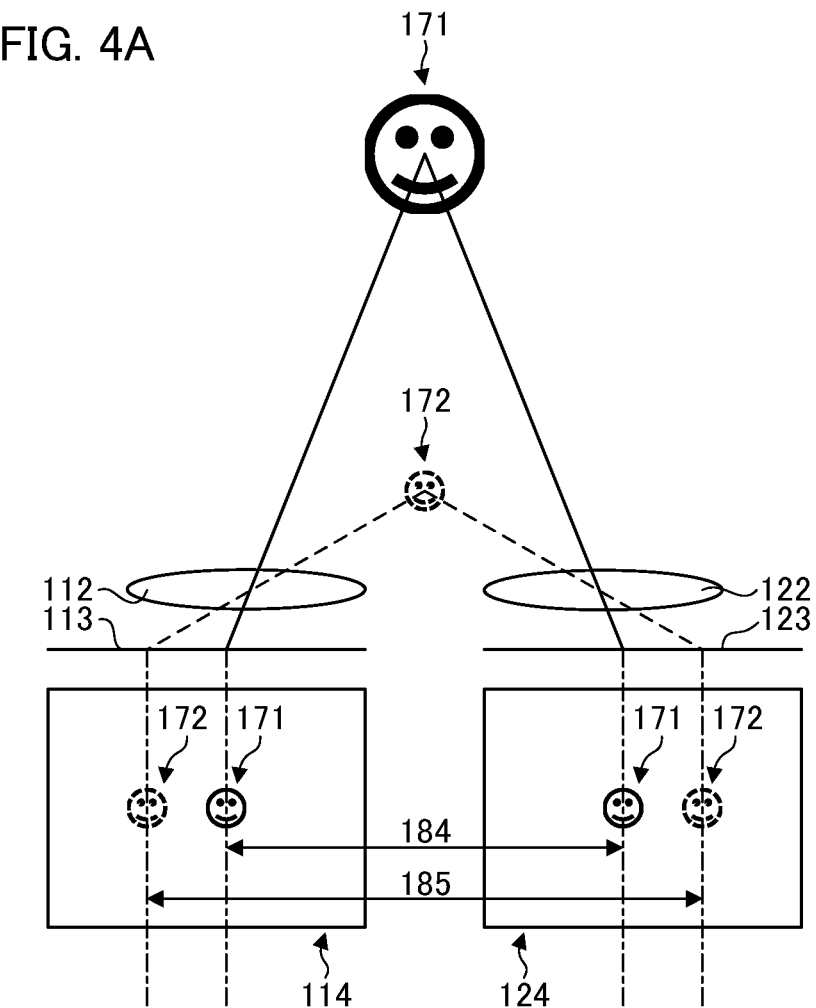
FIGS. 4A to 4C are diagrams illustrating a mechanism of occurrence of a double image in an overlapping range.
Figure 4B:
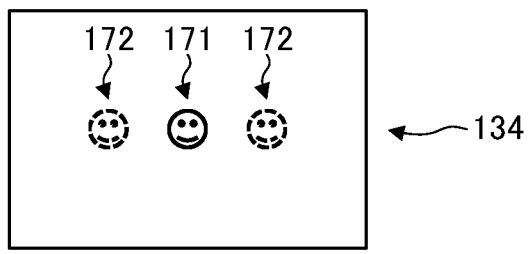
Figure 4C:
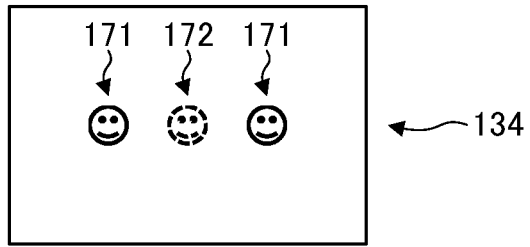

FIGS. 4A to 4C are diagrams illustrating a mechanism in which a double image is generated in the overlapping range 135. FIG. 4A illustrates a first image 114 and a second image 124 in a case in which a subject 171 far from the imaging apparatus 100 and a subject 172 close to the imaging apparatus 100 are imaged. In this drawing, an amount of positional deviation 184 represents an amount of positional deviation of the subject 171 located far between the first image 114 and the second image 124. On the other hand, an amount of positional deviation 185 represents an amount of positional deviation of the subject 172 located close between the first image 114 and the second image 124.

As can be understood from FIG. 4A, in the case of the subject 171 located far away, the amount of positional deviation 184 is smaller than the amount of positional deviation 185. On the other hand, in the case of the subject 172 located nearby, the amount of positional deviation 185 is smaller than the amount of positional deviation 184. Thus, in a case in which a wide-angle image 134 is generated by overlapping the first image 114 and the second image 124 while being shifted by the amount of positional deviation 184 from each other such that the subject 171 is superimposed, as illustrated in FIG. 4B, the subject 172 becomes a double image. Similarly, in a case in which a wide-angle image 134 is generated by overlapping the first image 114 and the second image 124 while being shifted by the amount of positional deviation 185 from each other such that the subject 172 is superimposed, as illustrated in FIG. 4C, the subject 171 becomes a double image.

In this way, in a case in which a plurality of subjects at different distances are imaged, in a generated wide-angle image 134, any one subject may become a double image in the overlapping range 135. Thus, in the imaging apparatus 100 according to this embodiment, one of the first imaging range 115 and the second imaging range 125 to be focused on is selected by a user. Then, the imaging direction of at least one of the first imaging unit 110 and the second imaging unit 120 is changed such that the likelihood of the selected imaging range becoming a joining part of a wide-angle image is reduced.

As illustrated in FIGS. 3B and 3D, when switching from the non-composition mode to the composition mode is performed, the imaging direction of the second imaging unit 120 is changed such that a wide-angle image 134 can be generated, and thus, there is a likelihood of the second imaging range 125 and the overlapping range 135 overlapping each other. On the other hand, the imaging direction of the first imaging unit 110 is maintained as it is, and thus, the overlapping range 135 can be confined only to a peripheral area of the first imaging range 115.

As described above, by designating an imaging unit imaging a subject of a user's interest in the form of a reference imaging unit at the time of switching of the composition mode, a likelihood of the subject of a user's interest being included in the overlapping range can be reduced. As a result, a likelihood of the subject of a user's interest being a double image can be reduced, and the visibility in a wide-angle image can be improved.

Generally, when a correlation coefficient is acquired using an SSD or an SAD, as the number of pixels used for calculating the amount of positional deviation becomes larger, a correlation coefficient having a higher accuracy can be acquired. As the overlapping range 135 increases, the number of pixels used for calculating the amount of positional deviation becomes larger. Thus, as the overlapping range 135 becomes larger, an amount of positional deviation having a higher accuracy can be acquired, and a wide-angle image having high quality can be generated.

Thus, in order to acquire an amount of positional deviation between the first image 114 and the second image 124, it is preferable that the size of the overlapping range 135 should be a sufficient size. More specifically, it is preferable that the number of pixels in the first image 114 and the second image 124 included in the overlapping range 135 be 100 or more. In addition, it is more preferable that the size of the overlapping range 135 be 20% or more of one of the first imaging range 115 and the second imaging range 125 that is not relatively larger.

In the description presented above, although the imaging direction of the first imaging unit 110 or the second imaging unit 120 is changed in a case in which switching from the non-composition mode to the composition mode is performed by a user, it is more preferable that the imaging direction be able to be changed by the user in addition to mode switching. At this time, for example, it is preferable that the imaging direction of the first imaging unit 110 or the second imaging unit 120 be able to be changed by a user operating the user interface 160.

However, as described above, in order to generate a wide-angle image 134, parts of the first imaging range 115 and the second imaging range 125 need to overlap each other. Thus, when the composition mode is selected by the user, it is preferable that the imaging directions of the first imaging unit 110 and the second imaging unit 120 should be limited to a range in which a wide-angle image 134 can be generated. More specifically, it is preferable that the imaging directions of the first imaging unit 110 and the second imaging unit 120 should be limited such that the number of pixels in the first image 114 and the second image 124 included in the overlapping range 135 is 100 or more. In addition, for example, a range in which a wide-angle image 134 can be generated may be displayed in the user interface 160 as a range in which the imaging range of the first imaging unit 110 or the second imaging unit 120 can be changed. In such a case, the user can visually recognize the changeable range, and the imaging range can be easily changed within a limit.

In addition, it is more preferable that the imaging directions of the first imaging unit 110 and the second imaging unit 120 should be limited such that the size of the overlapping range 135 is 20% or more of one of the first imaging range 115 and the second imaging range 125 that is not relatively larger.

At this time, when the composition mode is selected by the user, it is preferable that the imaging direction of the imaging unit that is set as the reference (the first imaging unit 110 illustrated in FIG. 3) be limited not to be changeable. The reason for this is that, when the imaging range of the reference imaging unit is changed, the likelihood of the range and the overlapping range 135 overlapping each other increases. By limiting the imaging range of the reference imaging unit such that it is not changeable, the likelihood of a subject of a user's interest being a double image can be reduced, and the visibility in a wide-angle image can be improved.

Furthermore, when the composition mode is selected by the user, in a case in which a change of the imaging directions of the first imaging unit 110 and the second imaging unit 120 over a limited range is instructed from the user, it is preferable that display of, for example, a warning or the like should be output to the user interface 160. More specifically, it is preferable to display an indication representing that a change of the imaging direction is limited due to the composition mode. Furthermore, it is more preferable to display an indication representing that a change of the imaging direction over a limited range can be performed through mode switching to the non-composition mode. In addition, for example, an image enabling a user to understand that a change of the imaging range is limited may be displayed, or a warning may be given using speech.

On the other hand, in a case in which a composition process is not performed by the composition processing unit 140, the first imaging range 115 and the second imaging range 125 may not overlap each other. Thus, when the non-composition mode is selected by a user, it is preferable that that imaging directions of the first imaging unit 110 and the second imaging unit 120 be able to be freely changed.

Second Embodiment

The imaging apparatus 100 according to the first embodiment designates an imaging range in which a subject of a user's interest is imaged in the form of a reference imaging unit at the time of composition mode switching. In contrast to that, an imaging apparatus 200 according to a second embodiment designates a range in which a subject of a user's interest is imaged in the form of a part of an imaging range imaged by a reference imaging unit at the time of composition mode switching. In accordance with this, an imaging range in which a subject of a user's interest is imaged can be designated more finely. Although the other configuration is almost the same as the configuration of the first embodiment, description using reference numerals in the 100's in the first embodiment will be substituted with description using reference numerals in the 200's in the second embodiment. Hereinafter, description will be presented. A case in which a user performs switching from the composition mode to the non-composition mode in an imaging apparatus 200 is similar to that of the imaging apparatus 100 according to the first embodiment, and thus description thereof will be omitted.

FIGS. 5A to 5D are diagrams illustrating an example of a relationship between a user interface and imaging directions of a first imaging unit 210 and a second imaging unit 220 in a case in which a user performs switching from the non-composition mode to the composition mode in an imaging apparatus 200 according to the second embodiment.

Figure 5B:
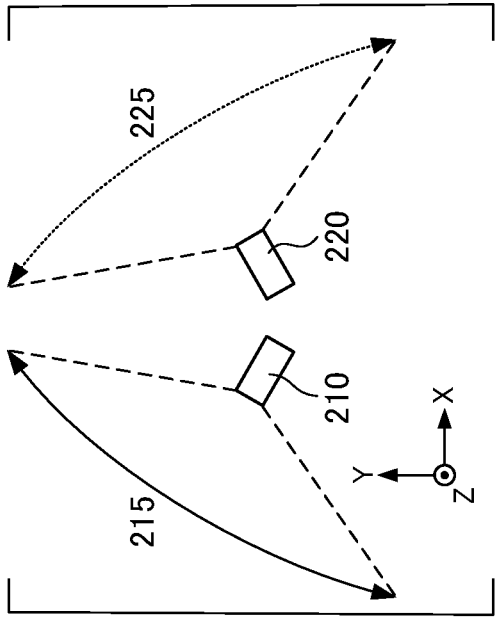
FIGS. 5A to 5E are diagrams illustrating an example of a relationship between display of a user interface and an imaging direction in an imaging apparatus according to a second embodiment.
Figure 5E:
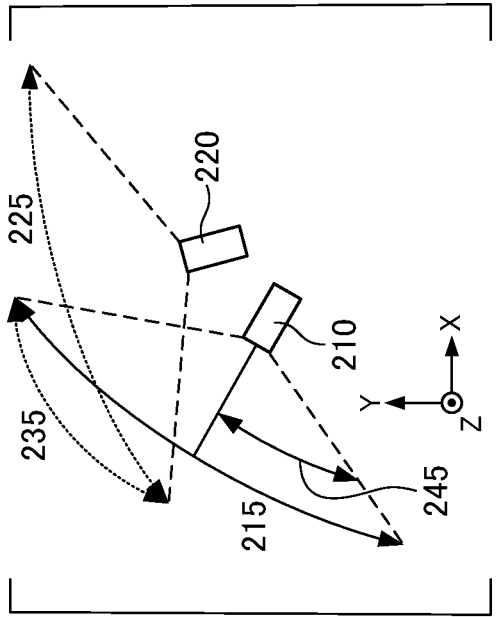
Figure 5A:
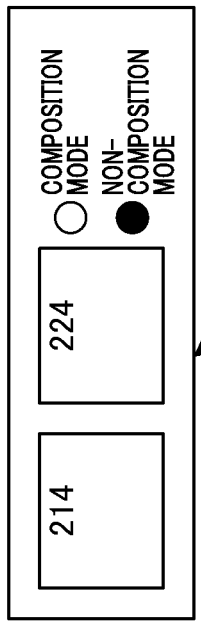

FIGS. 5A and 5B illustrate a state in which the composition mode is designated by a user as an initial state. In FIG. 5A, a first image 214 and a second image 224 are independently displayed in a user interface 260 such as a GUI on a display unit 183. At this time, the first imaging unit 210 and the second imaging unit 220 are directed in imaging directions illustrated in FIG. 5B.

Figure 5C:
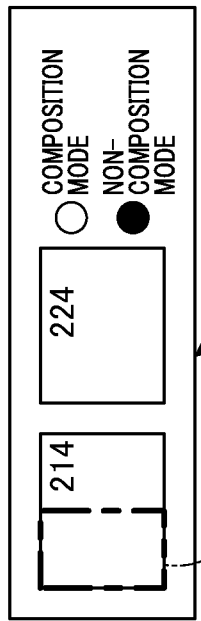

Here, it is assumed that switching from the non-composition mode to the composition mode is instructed by a user. In addition to this instruction, as illustrated in FIG. 5C, the user can designate an imaging range including a subject of a user's interest out of a first imaging range 215 or a second imaging range 225 as a designation range 245.

Figure 5D:
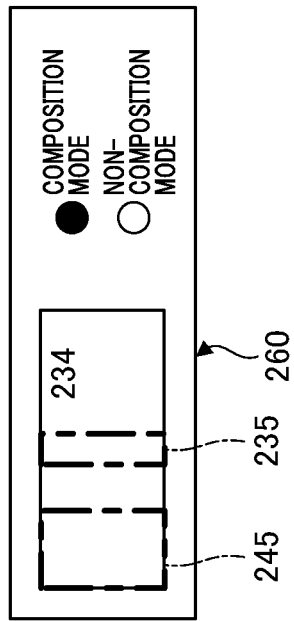

Then, as illustrated in FIG. 5E, a control unit 130 changes imaging directions of the first imaging unit 210 and the second imaging unit 220 such that the designation range 245 is not included in an overlapping range 235 of the first imaging range 215 and the second imaging range 225. Then, after the change of the imaging directions ends, a composition processing unit 240 starts generation of a wide-angle image 234 and, as illustrated in FIG. 5D, displays the wide-angle image 234 acquired by composing the first image 214 and the second image 224 in the user interface 260. In this way, by directly designating the designation range 245, the likelihood of a subject of a user's interest becoming a double image can be further reduced, which is preferable.

As described above, in order to generate the wide-angle image 234, parts of the first imaging range 215 and the second imaging range 225 need to overlap each other. Thus, in order for a user to designate the designation range 245, it is preferable to limit the size of the designation range 245. More specifically, in a case in which the designation range 245 is included in the first imaging range 215, the size of the designation range 245 is limited such that it is equal to or smaller than the size of a difference between the first imaging range 215 and the overlapping range 235. In a case in which the designation range 245 is included in the second imaging range 225, the size of the designation range 245 is limited such that it is equal to or smaller than the size of a difference between the second imaging range 225 and the overlapping range 235. At this time, for example, it is preferable that images should be displayed in the user interface 260 such that the size of the imaging range that can be designated as the designation range 245 becomes equal to or smaller than the size described above, in other words, the size of the imaging range that can be designated does not become a size over the range described above. In this way, it becomes easier for a user to designate a designation range within a limit.

In this way, by limiting the size of the designation range 245, calculation accuracy for the amount of positional deviation can be acquired while reducing the likelihood of a subject of a user's interest becoming a double image, and the visibility in a wide-angle image can be improved.

In this embodiment, although the designation range 245 is designated, a subject of a user's interest may be designated. In such a case, the control unit 230 changes the imaging ranges of the first imaging unit 210 and the second imaging unit 220 such that the designated subject is not included in the overlapping range 235 of the first imaging range 215 and the second imaging range 225.

Third Embodiment

In an imaging apparatus 300 according to a third embodiment, configurations of a first drive mechanism and a second drive mechanism are different from those of the imaging apparatus 100 according to the first embodiment. In the imaging apparatus 300, a first imaging unit 310 and a second imaging unit 320 are configured to be rotatable in two directions that are orthogonal to each other. More specifically, in addition to a rotation mechanism (a so-called panning drive mechanism) having a Z axis (vertical axis) illustrated in FIG. 1A as its center, a rotation mechanism (a so-called tilt drive mechanism) that can control an angle with respect to the Z axis is included. In other words, the imaging apparatus 300 includes a drive mechanism that can be driven in a tilt direction. The configuration is otherwise almost the same as that according to the second embodiment, and description using reference numerals in the 200's in the second embodiment will be substituted with description using reference numerals in the 300's in the third embodiment.

FIGS. 6A to 6E are diagrams illustrating an example of a relationship between a user interface and imaging ranges of a first imaging unit 310 and a second imaging unit 320 in a case in which a user performs switching from the non-composition mode to the composition mode in the imaging apparatus 300 according to the third embodiment.

Relation between the user interface and the imaging ranges of the first imaging unit 310 and the second imaging unit 320 in the imaging apparatus 300 in a case in which the user performs switching from the non-composition mode to the composition mode is illustrated in FIGS. 6A to 6E. In the imaging apparatus 300, a case in which the user performs switching from the composition mode to the non-composition mode is the same as that of the imaging apparatus 100 according to the first embodiment, and thus description thereof will be omitted.

Figure 6A:
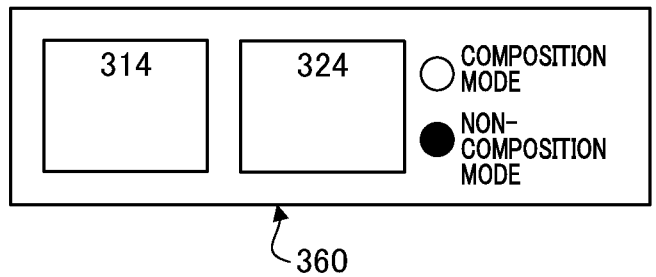
FIGS. 6A to 6E are diagrams illustrating an example of a relationship between display of a user interface and an imaging range in an imaging apparatus according to a third embodiment.
Figure 6B:
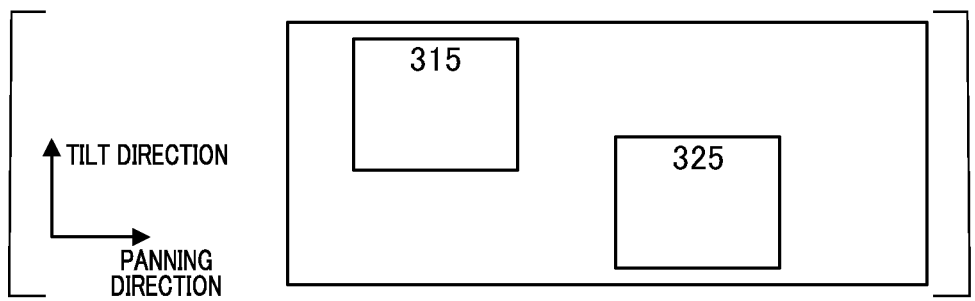

FIGS. 6A and 6B illustrate a state in which the non-composition mode is designated by a user as an initial state. In FIG. 6A, a first image 314 and a second image 324 are independently displayed in a user interface 360. At this time, the first imaging unit 310 and the second imaging unit 320 image imaging ranges illustrated in FIG. 6B. In FIG. 6B, the imaging directions of the first imaging unit 310 and the second imaging unit 320 are illustrated as a first imaging range 315 and a second imaging range 325 projected onto a cylindrical surface having the Z axis illustrated in FIG. 1A as its center and having the same radius. As can be understood from FIG. 6B, both an imaging direction of a panning direction and an imaging direction of a tilt direction are different in the first imaging unit 310 and the second imaging unit 320.

Here, it is assumed that switching from the non-composition mode to the composition mode is instructed by a user. In addition to this instruction, the user instructs one of the first imaging unit 310 and the second imaging unit 320 that is to be used as a reference for generating a composition image. Hereinafter, a case in which the first imaging unit 310 is designated as a reference will be described as an example.

Figure 6C:
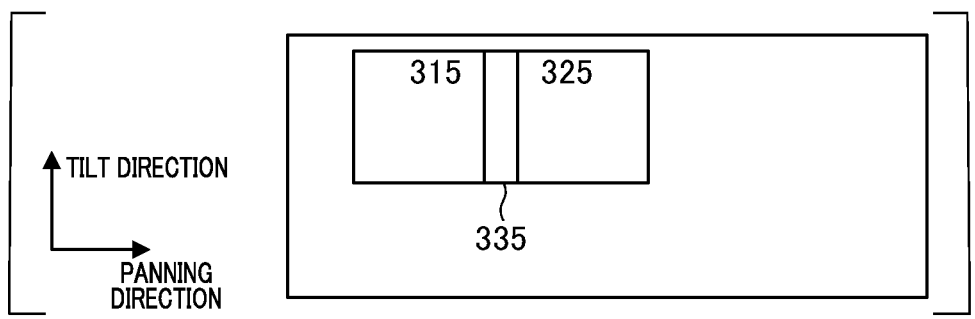
Figure 6D:
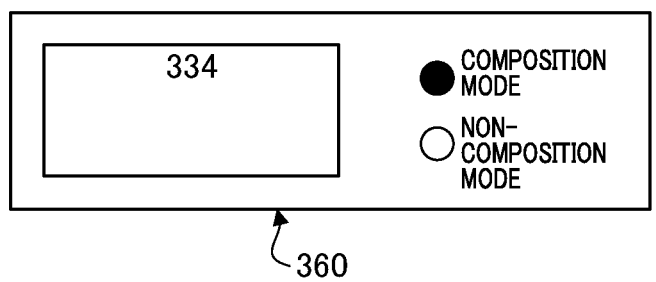

When a user designates the first imaging unit 310 as the reference, as illustrated in FIG. 6C, a control unit 230 changes the imaging direction of the second imaging unit 320. Then, after the change of the imaging direction ends, as illustrated in FIG. 6D, a composition processing unit 340 starts generation of a wide-angle image 334 and displays the wide-angle image 334 acquired by composing the first image 314 and the second image 324 in the user interface 360.

As can be understood by comparing FIG. 6B with FIG. 6C, the imaging apparatus 300 maintains the imaging direction of the first imaging unit 310 as it is and changes the imaging direction of the panning direction and the imaging direction of the tilt direction of the second imaging unit 320. More specifically, for the tilt direction, the imaging direction is changed such that the imaging directions of the first imaging unit 310 and the second imaging unit 320 match with each other, and, for the panning direction, the imaging directions are changed such that an overlapping range 335 for generating a wide-angle image 334 can be secured.

In this way, by also changing the imaging direction of the tilt direction to match the imaging range of the reference imaging unit, the wide-angle image 334 can be generated while reducing the likelihood of a subject of a user's interest becoming a double image.

Figure 6E:
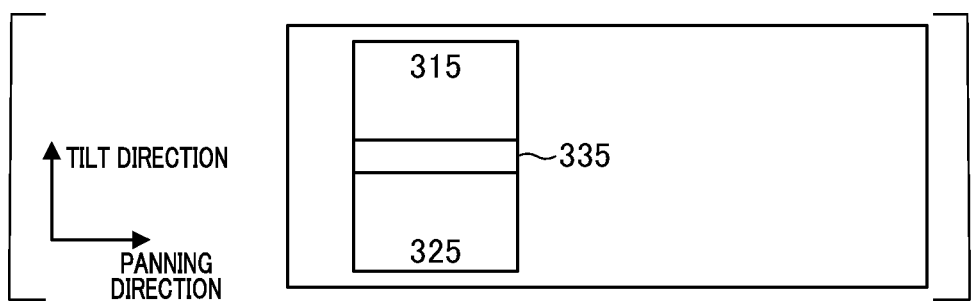

As illustrated in FIG. 6E, by causing the imaging directions of the panning directions of the first imaging unit 310 and the second imaging unit 320 to match with each other and causing the imaging directions of the tilt directions to deviate from each other, a wide-angle image 334 that is long in the tilt direction may be generated. It is more preferable that the user interface 360 should be configured such that a user can select whether a wide-angle image that is long in the panning direction is generated or a wide-angle image that is long in the tilt direction is generated. In addition, it is more preferable that a relative positional relation of the second imaging unit 120 with respect to the first imaging unit 110 should be configured to be able to be designated.

Fourth Embodiment

An imaging apparatus 400 according to a fourth embodiment has configurations of a first drive mechanism and a second drive mechanism that are different from those of the imaging apparatus 300 according to the third embodiment. The imaging apparatus 400 includes a rotation mechanism (a so-called rotating mechanism) that can rotate each imaging unit around the center of an optical axis of the imaging unit in addition to being capable of controlling the imaging directions and the imaging ranges of the first imaging unit 410 and the second imaging unit 420. The configuration is otherwise almost the same as that according to the third embodiment, and description using reference numerals in the 300's in the third embodiment will be substituted with description using reference numerals in the 400's in the fourth embodiment.

FIGS. 7A to 7E are diagrams illustrating an example of a relationship between a user interface and imaging ranges of a first imaging unit 410 and a second imaging unit 420 in a case in which a user performs switching from the non-composition mode to the composition mode in the imaging apparatus 400 according to the fourth embodiment. In the imaging apparatus 400, a case in which the user performs switching from the composition mode to the non-composition mode is the same as that of the imaging apparatus 100 according to the first embodiment, and thus description thereof will be omitted.

Figure 7A:
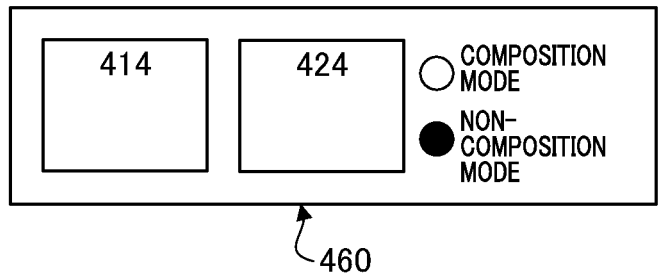
FIGS. 7A to 7E are diagrams illustrating an example of a relationship between display of a user interface and an imaging range in an imaging apparatus according to a fourth embodiment.
Figure 7B:
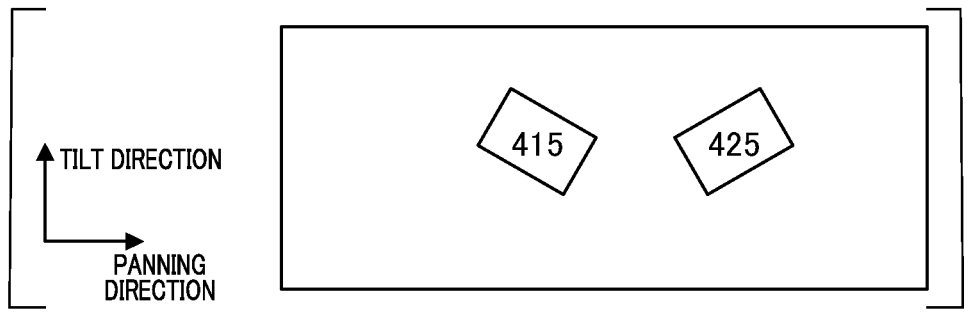

In FIG. 7A, a first image 414 and a second image 424 are independently displayed in a user interface 460. At this time, imaging directions and rotation angles around optical axes (hereinafter, referred to as rotation angles) of the first imaging unit 410 and the second imaging unit 420 are as illustrated in FIG. 7B. As can be understood from FIG. 7B, all the imaging directions of the panning direction, imaging directions of the tilt direction, and rotation angles are different in the first imaging unit 410 and the second imaging unit 420.

Figure 7C:
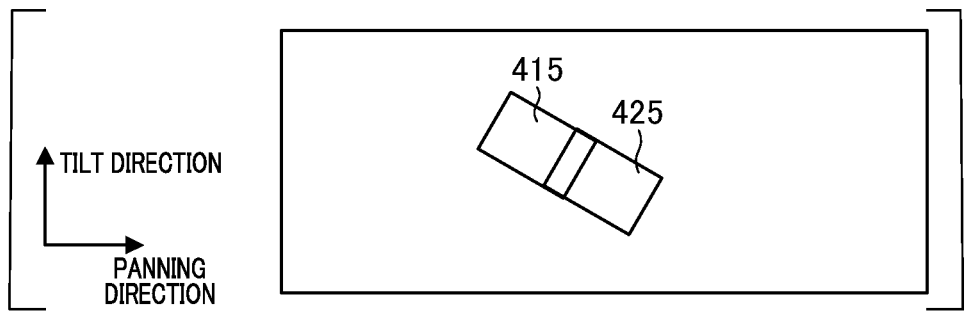
Figure 7D:
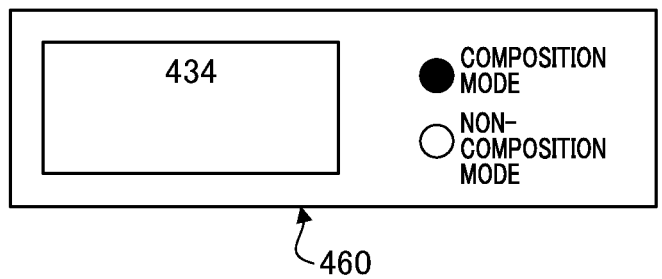

Here, it is assumed that switching from the non-composition mode to the composition mode is instructed by a user. At the same time, the user instructs one of the first imaging unit 410 and the second imaging unit 420 that is to be used as a reference for generating a composition image, for example, through the user interface 460. Hereinafter, a case in which the first imaging unit 410 is designated as a reference will be described as an example. Then, as illustrated in FIG. 7C, the imaging direction of the second imaging unit 420 and the rotation angle around the optical axis are changed. Then, after the change of the imaging direction and the rotation angle end, as illustrated in FIG. 7D, a composition processing unit 440 starts generation of a wide-angle image 434 and displays the wide-angle image 434 in the user interface 460. As can be understood by comparing FIG. 7B with FIG. 7C, the imaging apparatus 400 maintains the imaging direction of the first imaging unit 410 as it is and changes the imaging direction of the panning direction, the imaging direction of the tilt direction, and the rotation angle of the second imaging unit 420. More specifically, the rotation angle of the second imaging unit 420 is changed such that the rotation angles of the first imaging unit 410 and the second imaging unit 420 match with each other. Then, the imaging directions of the panning direction and the tilt direction of the second imaging unit 420 are changed such that an overlapping range 435 for generating a wide-angle image 434 can be secured.

In this way, by also changing the rotation angle to match the imaging range of the reference imaging unit, a wide-angle image 434 can be generated while reducing the likelihood of a subject of a user's interest becoming a double image.

Figure 7E:
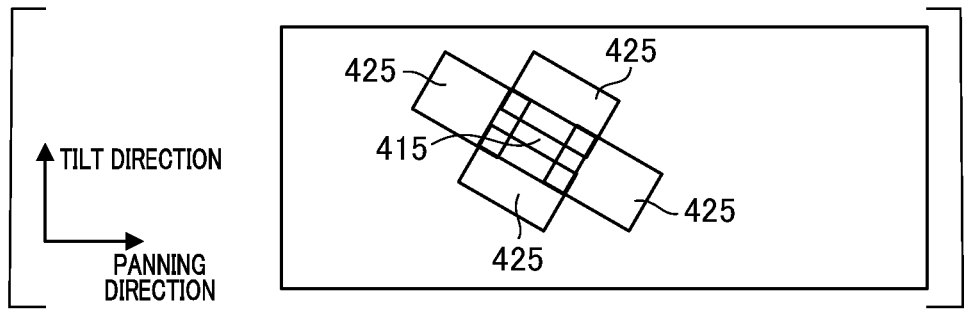

As an imaging direction of the second imaging unit 420 for securing the overlapping range 435 while the rotation angles are caused to match with each other, any one of four imaging directions illustrated in FIG. 7E may be selected. Thus, it is more preferable that one of the four imaging directions should be configured to be selectable by a user.

Fifth Embodiment

In an imaging apparatus 500 according to a fifth embodiment, the configurations of a first drive mechanism and a second drive mechanism and configurations of a first imaging unit and a second imaging unit are different from those of the imaging apparatus 100 according to the first embodiment. The imaging apparatus 500 has a configuration (a configuration including a so-called zooming mechanism) that can control imaging ranges in addition to the imaging directions of the first imaging unit 510 and the second imaging unit 520. More specifically, an imaging optical system of each imaging unit includes a zoom lens that can be moved in an optical axis direction, and the first drive mechanism 511 and the second drive mechanism 521 control imaging ranges of the imaging units by driving the zoom lenses. The other configuration is almost the same as that according to the fourth embodiment, and description using reference numerals of 400's in the fourth embodiment will be substituted with description using reference numerals of 500's in the fifth embodiment.

Generally, in a case in which an amount of positional deviation between two images is acquired using an SSD or an SAD, it is preferable that resolutions of the two images should be uniform for improving the calculation accuracy of the amount of positional deviation. For this reason, the imaging apparatus 500 according to the fifth embodiment drives the zoom lenses such that the resolutions of a first image 514 and a second image 524 at the time of the composition mode match with each other.

Hereinafter, a case in which the number of pixels of a solid-state imaging device 513 in the first imaging unit 510 is the same as the number of pixels of a solid-state imaging device 523 in the second imaging unit 520 will be described as an example. In a case in which the numbers of the pixels are the same, when the sizes (hereinafter, referred to as field angles) of the imaging ranges of the first imaging unit 510 and the second imaging unit 520 are the same, the resolutions of the first image 514 and the second image 524 match with each other.

FIGS. 8A to 8D are diagrams illustrating an example of a relationship between a user interface and imaging ranges of a first imaging unit 510 and a second imaging unit 520 in the imaging apparatus 500 according to the fifth embodiment in a case in which a user performs switching from the non-composition mode to the composition mode. A case in which a user performs switching from the composition mode to the non-composition mode in the imaging apparatus 500 is similar to that of the imaging apparatus 100 according to the first embodiment, and thus description thereof will be omitted.

Figure 8A:
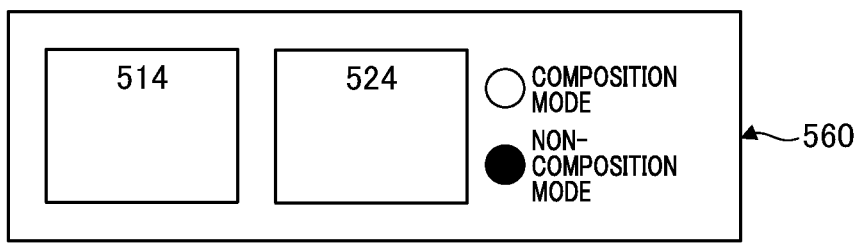
FIGS. 8A to 8D are diagrams illustrating an example of a relationship between display of a user interface and an imaging range in an imaging apparatus according to a fifth embodiment.
Figure 8B:
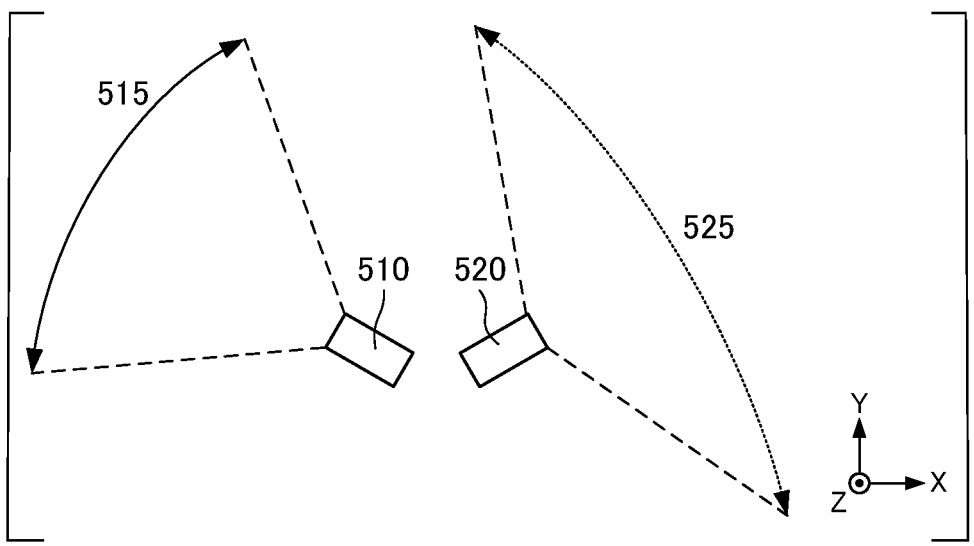

In FIG. 8A, a first image 514 and a second image 524 are independently displayed in a user interface 560. At this time, the imaging directions and the field angles of the first imaging unit 510 and the second imaging unit 520 are as illustrated in FIG. 8B. As can be understood from FIG. 8B, both the imaging directions of the panning direction and the field angles are different between the first imaging unit 510 and the second imaging unit 520.

Here, it assumed that a user instructs switching from the non-composition mode to the composition mode, for example, through the user interface 560. At the same time, the user instructs one of the first imaging unit 510 and the second imaging unit 520 that is to be used as a reference for generating a composition image. Hereinafter, a case in which the first imaging unit 510 is designated as a reference will be described as an example.

Figure 8C:
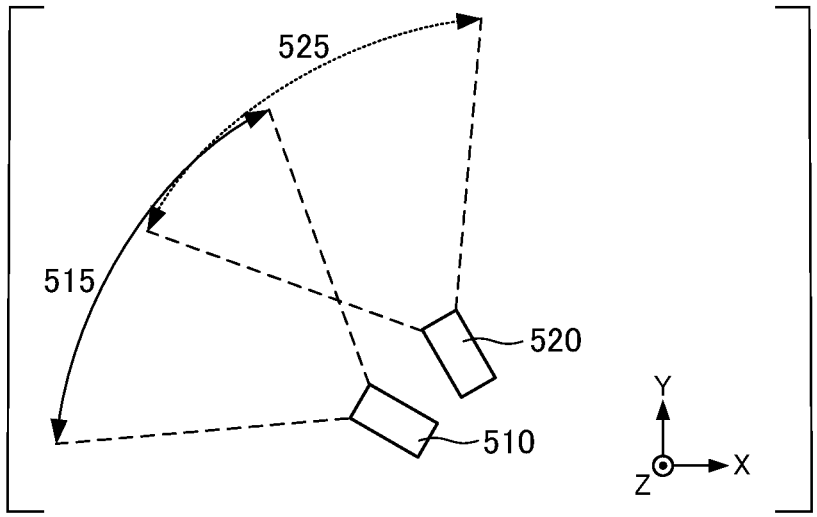
Figure 8D:
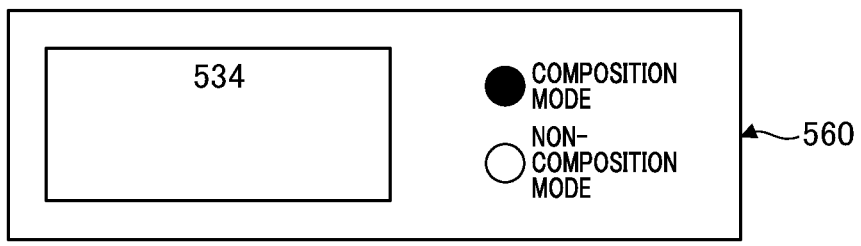

Then, as illustrated in FIG. 8C, the imaging direction and the field angle of the second imaging unit 520 are changed. Then, after the change of the imaging direction and the field angle end, as illustrated in FIG. 8D, a composition processing unit 540 starts generation of a wide-angle image 534 and displays the wide-angle image 534 in the user interface 560.

As can be understood by comparing FIG. 8B with FIG. 8C, the imaging apparatus 500 maintains the imaging direction of the first imaging unit 510 as it is and changes the imaging direction and the zoom magnification of the second imaging unit 520. More specifically, the field angle of the second imaging unit 520 is changed such that the field angles of the first imaging unit 510 and the second imaging unit 520 match with each other. Then, the imaging direction of the second imaging unit 520 is changed such that an overlapping range 535 used for generating a wide-angle image 534 can be secured. In other words, the zoom lenses are driven such that the resolutions of the first image 514 and the second image 524 match with each other.

In this way, by also changing the zoom magnification to match the resolution of the reference imaging unit, the calculation accuracy of the amount of positional deviation can be improved while reducing the likelihood of a subject of a user's interest becoming a double image, and the visibility in the wide-angle image 434 can be improved. The number of pixels of a solid-state imaging device 513 in the first imaging unit 510 may be configured to be different from the number of pixels of a solid-state imaging device 523 in the second imaging unit 520. Even in such a case, the zoom lenses may be driven such that the resolutions of the first image 514 and the second image 524 match with each other. More specifically, it is preferable that the zoom magnifications are changed such that a quotient acquired by dividing the size of the first imaging range 515 by the number of pixels of the imaging device of the first imaging unit 510 should match with a quotient acquired by dividing the size of the second imaging range 525 by the number of pixels of the imaging device of the second imaging unit 520. Here, the match may have error of about 10%. Here, the size of the imaging range represents a length (the length in the panning direction in FIG. 8) of the imaging range in a direction in which positions of mutual imaging ranges deviate from each other.

Sixth Embodiment

In the first to fifth embodiments, although a case in which each imaging device includes two imaging units including the first imaging unit and the second imaging unit has been illustrated, each imaging device may include three or more imaging units. In a sixth embodiment, an imaging apparatus 600 that includes a third imaging unit 690 in addition to a first imaging unit 610 and a second imaging unit 620 and can generate a wide-angle image by imaging in the panning direction around 360 degrees with the imaging apparatus as the center will be described. The other configuration is almost the same as that according to the fifth embodiment, and description using reference numerals of 500's in the fifth embodiment will be substituted with description using reference numerals of 600's in the sixth embodiment.

FIGS. 9A to 9D are diagrams illustrating an example of a relationship between a user interface and imaging ranges of a first imaging unit 610, a second imaging unit 620, and a third imaging unit 690 in a case in which a user performs switching from the non-composition mode to the composition mode in the imaging apparatus 600 according to the sixth embodiment. The imaging apparatus 600 according to the sixth embodiment includes the first imaging unit 610, the second imaging unit 620, and the third imaging unit 690. The configuration of the third imaging unit 690 is almost the same as that of the first imaging unit 610 and the second imaging unit 620, and thus description thereof will be omitted. In the imaging apparatus 600, in a case in which a user performs switching from the composition mode to the non-composition mode, imaging ranges of the first imaging unit 610, the second imaging unit 620, and the third imaging unit 690 are not changed unless an instruction is input from the user. For this reason, description thereof will be omitted here.

Figure 9A:
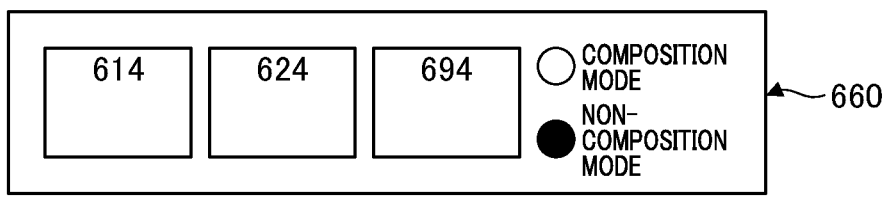
FIGS. 9A to 9D are diagrams illustrating an example of a relationship between display of a user interface and an imaging range in an imaging apparatus according to a sixth embodiment.
Figure 9B:
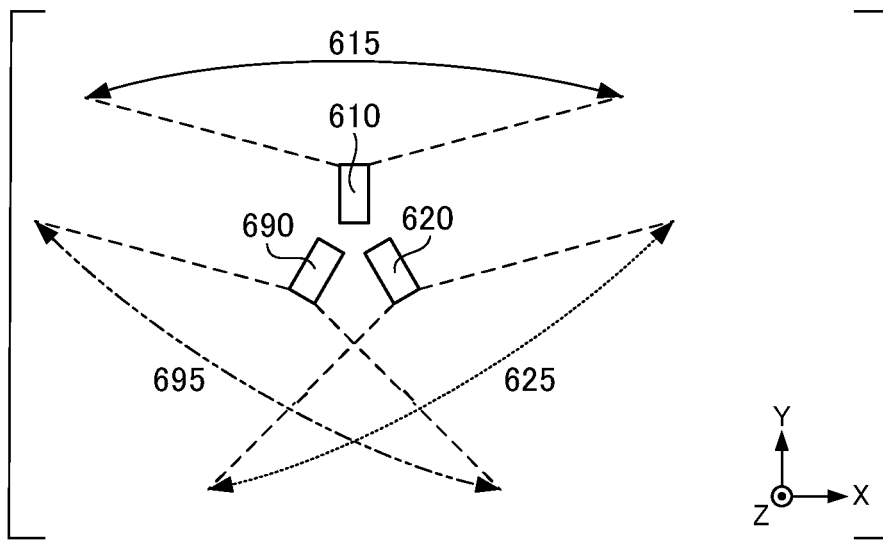

In FIG. 9A, a third image 694 is independently displayed in addition to a first image 614 and a second image 624 in a user interface 660. At this time, imaging directions of the second imaging unit 620 and the third imaging unit 690 are as illustrated in FIG. 9B.

Figure 9C:
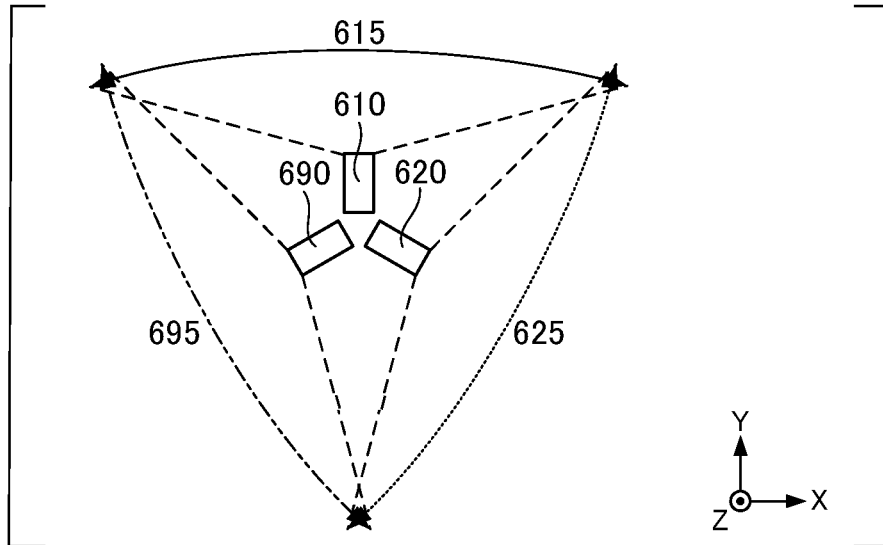
Figure 9D:
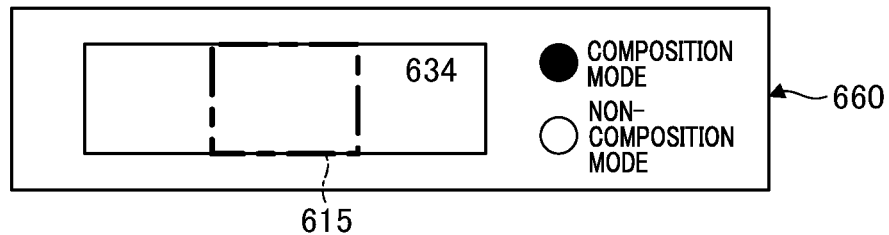

Here, it is assumed that switching from the non-composition mode to the composition mode is instructed by a user. At the same time, the user instructs an imaging unit that is to be used as a reference for generating a composition image. Hereinafter, a case in which the first imaging unit 610 is designated as a reference will be described as an example. Then, as illustrated in FIG. 9C, the imaging directions of the second imaging unit 620 and the third imaging unit 690 are changed. Then, after the change of the imaging directions ends, as illustrated in FIG. 9D, a composition processing unit 640 combines a first image 614, a second image, and a third image 694 and starts generation of a wide-angle image 634. Thereafter, the wide-angle image 634 acquired by imaging in the panning direction around 360 degrees is displayed in the user interface 660.

By employing such a configuration, a wide-angle image acquired by imaging around 360 degrees can be generated while reducing the likelihood of a subject of a user's interest becoming a double image. In an imaging apparatus like the imaging apparatus 600 that generates a wide-angle image by imaging around 360 degrees, as in this embodiment, there is a strong advantage of changing an overlapping range in accordance with an area of interest designated by a user. Hereinafter, description thereof will be presented.

In the case of the imaging apparatuses according to the first to fifth embodiments, the imaging range of a wide-angle image is changed in accordance with the position of a subject of a user's interest. In this case, a user needs to designate an area of interest also in consideration of the imaging range of a wide-angle image in addition to an imaging range (an area of interest) including a subject of interest. In other words, there are cases in which it is difficult to cope with both the imaging range of a wide-angle image and the area of interest. Here, an area of interest is an imaging range in a case in which the imaging range set as a reference is designated and represents a designation range in a case in which the designation range is designated.

On the other hand, in the imaging apparatus 600 that generates a wide-angle image acquired by imaging around 360 degrees, the imaging range of a wide-angle image is not changed regardless of an area of interest designated by the user. For this reason, the user can perform only the designation of an area of interest without the imaging range of the wide-angle image taken into account. As a result, even when the user designates a certain range as an area of interest, it is possible to cope with both the imaging range of the wide-angle image and the area of interest.

In FIG. 9C, although the imaging directions are changed such that angles formed by the imaging directions of the first imaging unit 610, the second imaging unit 620, and the third imaging unit 690 are the same, the angles formed by the imaging directions may not be the same. However, it is preferable to change the imaging directions such that the numbers of pixels included in overlapping ranges between the imaging units are the same. Particularly, in a case in which each imaging unit uses the same imaging optical system and the same solid-state imaging device, it is preferable to change the imaging directions such that angles formed by the imaging directions are the same.

In FIG. 9D, although the wide-angle image 634 is generated such that the first imaging range 615 of the first imaging unit 610 designated as a reference is displayed at the center of the wide-angle image 634, any one of the second imaging range 625 and the third imaging range 695 may be displayed at the center. However, it is preferable to display the area of a user's interest at the center of the wide-angle image for improving the visibility in the area of the interest.

Also in the imaging apparatus 600, it is more preferable that each of the first imaging unit 610, the second imaging unit 620, and the third imaging unit 690 should be configured to control not only an imaging direction of the panning direction but also an imaging direction of the tilt direction, a rotation angle, and a field angle.

It is assumed that each of the first imaging unit 610, the second imaging unit 620, and the third imaging unit 690 is configured to control both the imaging direction of the panning direction and the imaging direction of the tilt direction. In this case, as in the imaging apparatus according to the third embodiment, it is preferable that a wide-angle image acquired by imaging around 360 degrees is generated with the imaging direction of the tilt direction configured to match with the imaging unit designated as the reference.

On the other hand, it is assumed that each of the first imaging unit 610, the second imaging unit 620, and the third imaging unit 690 includes a rotation angle drive mechanism. In this case, when the composition mode is selected, it is preferable that the rotation angles of all the imaging units are changed to constant values regardless of the rotation angle of the imaging unit designated as the reference. The reason will be described as follows.

Generally, there are many cases in which a solid-state imaging device of an imaging unit used for monitoring or the like has a rectangular shape having a length in the horizontal direction to be longer than a length in the vertical direction. Thus, in order to generate a wide-angle image 364 of 360 degrees, it is necessary that the imaging range of each imaging unit be a rectangle having a long side in the panning direction, or the imaging range of each imaging unit be a rectangle having a long side in the tilt direction. For this reason, in a case in which switching to the composition mode is instructed, it is preferable that the imaging range of each imaging unit should match with one of the rectangle having the long side in the panning direction or the rectangle having the long side in the tilt direction.

In order to improve the calculation accuracy of the amount of positional deviation by increasing the size of the overlapping area, it is preferable that the imaging range should match with the rectangle having the long side in the panning direction. On the other hand, in a case in which it is desired to broaden the imaging range in the tilt direction, it is preferable that the imaging range should match with the rectangle having the long side in the tilt direction.

It is assumed that each of the first imaging unit 610, the second imaging unit 620, and the third imaging unit 690 includes a zoom control mechanism. In this case, the zoom magnification of the imaging optical system of each imaging unit may be set such that a wide-angle image 634 acquired by imaging around 360 degrees can be generated when the field angles of all the imaging units become equal to or larger than a threshold. The threshold is preferably close to a value for which the field angle becomes a maximum and is more preferably the value for which the field angle becomes the maximum. The reason for this is that the imaging range of the wide-angle image 634 is not broadened even when the field angle is further increased. Furthermore, at this time, when the composition mode is selected, it is preferable that the field angles of all the imaging units should be changed to maximum values regardless of the field angle of the imaging unit designated as the reference. By employing such a configuration, the use can be divided such that the composition mode is selected in a case in which imaging with the entire 360 degrees overlooked is desired, and the non-composition mode is selected in a case in which a specific area is desired to be imaged in detail and an image having high resolution is acquired by narrowing the field angle of each imaging unit.

Figure 10:
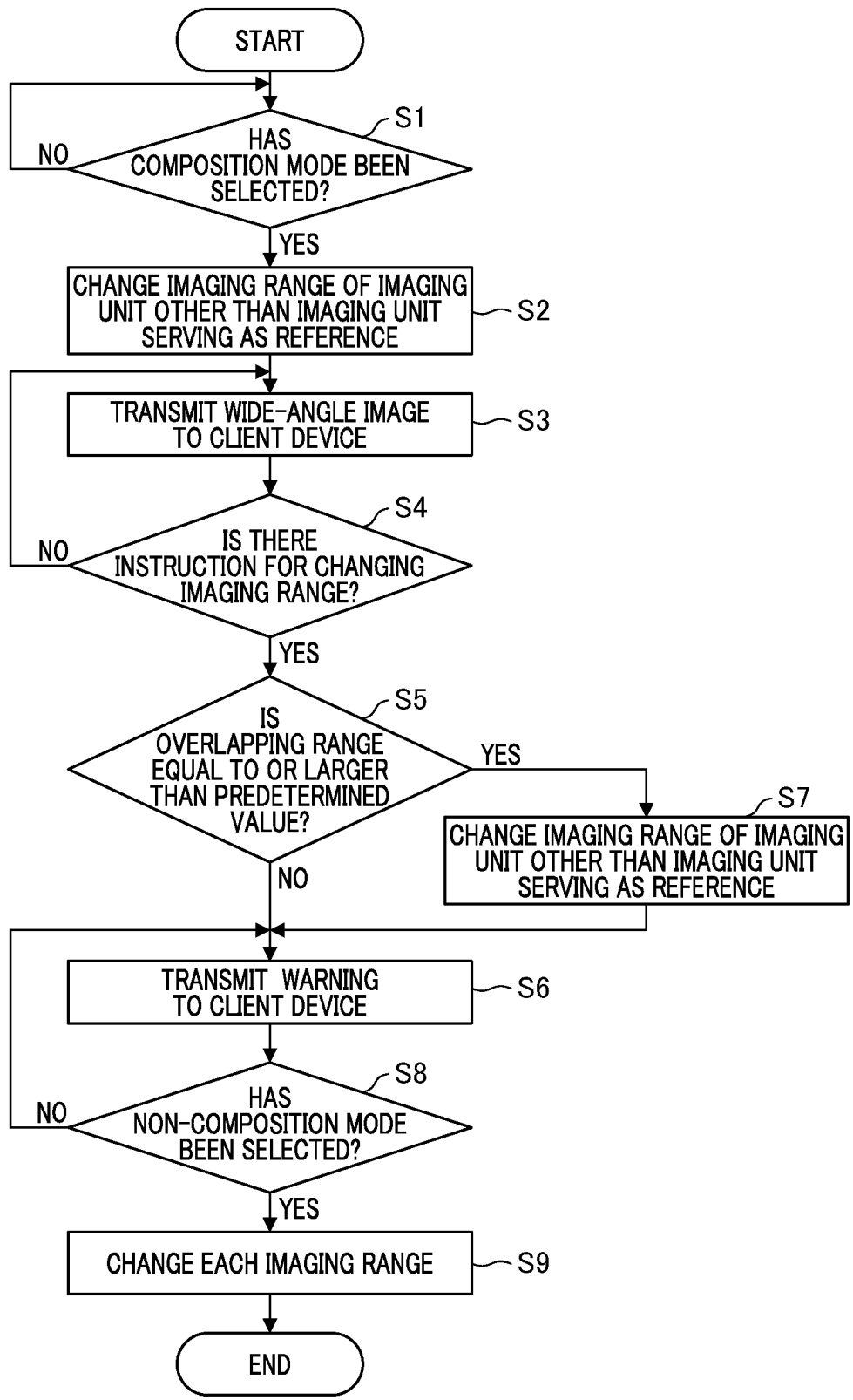
FIG. 10 is a flowchart illustrating an example of driving of the imaging apparatus according to the sixth embodiment.

Here, an example of driving of the imaging apparatus 600 will be described. FIG. 10 is a flowchart illustrating an example of driving of the imaging apparatus 600 according to the sixth embodiment. Each operation (step) represented by this flowchart is executed by the control unit 630. In this flowchart, a drive example in a case in which the non-composition mode is designated by a user as an initial state, and the user performs switching from the non-composition mode to the composition mode will be described. First, the control unit 630 determines whether or not an instruction for selecting the composition mode has been received (S1). In a case in which the instruction for selecting the composition mode has been received (Yes), imaging ranges of imaging units other than an imaging unit serving as a reference among the first imaging unit 610, the second imaging unit 620, and the third imaging unit 690 are changed (S2). More specifically, for example, in a case in which the first imaging unit 610 is designated as the reference, the imaging directions of the second imaging unit 620 and the third imaging unit 690 are changed without changing the imaging direction of the first imaging unit 610. Then, as described above, the top face resolutions, the tilt angles, and the rotation angles of the first imaging unit 610, the second imaging unit 620, and the third imaging units 690 are matched to each other. Thereafter, the wide-angle image 634 is transmitted to the client device 180 (S3). In accordance with this, the wide-angle image 634 is displayed on the display unit 183 of the client device 180.

Next, the control unit 630 determines whether or not a change of the imaging range has been instructed using the user interface 660. In a case in which a change of the imaging range is instructed (Yes), it is determined whether the overlapping range is equal to or larger than a predetermined value (S4). In a case in which the overlapping range is not equal to or larger than the predetermined value (No), the control unit 630 transmits a warning to the client device 180 (S6). In a case in which the overlapping range is equal to or larger than the predetermined value (Yes in S5), similar to S2, the imaging ranges of the imaging units other than the imaging unit serving as the reference are changed (S7), and, thereafter, the control unit 630 transmits a warning to the client device 180. (S6). In accordance with the warning transmitted to the client device 180, the warning is issued in the client device 180. At this time, in a case in which the instructed change of the imaging range is within a limit range, a warning may not need to be transmitted. In this case, for example, the wide-angle image 634 may be continuously displayed in the user interface 660 without transmission of the warning.

Thereafter, the control unit 630 determines whether or not the non-composition mode has been selected (S8). In a case in which the non-composition mode has been selected (Yes), the imaging range of each of the first imaging unit 610, the second imaging unit 620, and the third imaging unit 690 including the imaging unit serving as the reference is changed (S9), and the driving ends.

By employing such a configuration, the likelihood of a subject of interest becoming a double image can be reduced also in the imaging apparatus that can generate a wide-angle image of 360 degrees.

While preferred embodiments of the present invention have been described in detail, the present invention is not limited to the embodiments described above, and various modifications can be made on the basis of the gist of the present invention, and those are not excluded from the scope of the present invention.

For example, in the embodiments described above, each imaging unit is configured to be able to change the imaging range (the imaging direction, the zoom magnification, the rotation angle of the imaging surface, and the like) using a drive mechanism. However, for example, a driving mechanism that can control the imaging range of at least one imaging unit may be included, and the imaging ranges of a plurality of imaging units may be configured to be relatively changeable in accordance therewith.

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2019-132148, filed Jul. 17 2019, which is hereby incorporated by reference wherein in its entirety.

What is claimed is:

1. An imaging apparatus comprising:
a first imaging unit and a second imaging unit;
a first drive mechanism configured to control the first imaging unit;
a second drive mechanism configured to control the second imaging unit; and
at least one processor or circuit configured to function as:
a composition processing unit configured to generate a wide-angle image by compositing a first image acquired by the first imaging unit and a second image acquired by the second imaging unit;
an acquiring unit configured to acquire an instruction for selecting a composition mode for generating the wide-angle image or a non-composition mode for individually generating the first image and the second image; and
a control unit configured to control an imaging range of at least one of the first imaging unit and the second imaging unit so that a subject of interest is not included in an overlapping range of an imaging range of the first imaging unit and an imaging range of the second imaging unit in a case in which the acquiring unit acquires a switching instruction to the composition mode from the non-composition mode.

2. The imaging apparatus according to claim 1, wherein the acquiring unit is configured to acquire information relating to an imaging range including the subject of interest.

3. The imaging apparatus according to claim 1, wherein the control unit is configured to change an imaging range of an imaging unit other than a selected imaging unit in a case in which the switching instruction from the non-composition mode to the composition mode and information relating to the imaging unit selected by a user have been acquired.

4. The imaging apparatus according to claim 1, wherein the acquiring unit acquires information on an imaging unit selected by a user out of the first imaging unit or the second imaging unit.

5. The imaging apparatus according to claim 1, wherein the control unit is configured to limit changeable ranges of imaging ranges of the first imaging unit and the second imaging unit to ranges for which the wide-angle image can be generated in a case in which an instruction for selecting the composition mode has been acquired.

6. The imaging apparatus according to claim 1, wherein the control unit is configured to limit an imaging range of an imaging unit out of the first imaging unit and the second imaging unit, such that the imaging range of the imaging unit which is capturing the subject of interest is not changeable in a case in which an instruction for selecting the composition mode has been acquired.

7. The imaging apparatus according to claim 1,
wherein the first drive mechanism is able to change the imaging range of the first imaging unit in a panning direction or a tilt direction, and the second drive mechanism is able to change the imaging range of the second imaging unit in the panning direction or the tilt direction, and
wherein the control unit controls an imaging range of at least one of the first imaging unit and the second imaging unit such that the tilt direction of the imaging range of the first imaging unit and the tilt direction of the imaging range of the second imaging unit match with each other in a case in which the switching instruction from the non-composition mode to the composition mode has been acquired.

8. The imaging apparatus according to claim 1,
wherein the first drive mechanism is able to change the imaging range of the first imaging unit in a panning direction or a tilt direction, and the second drive mechanism is able to change the imaging range of the second imaging unit in the panning direction or the tilt direction, and
wherein the control unit controls an imaging range of at least one of the first imaging unit and the second imaging unit such that a panning direction of the imaging range of the first imaging unit and a panning direction of the imaging range of the second imaging unit match with each other in a case in which the switching instruction from the non-composition mode to the composition mode has been acquired.

9. The imaging apparatus according to claim 1,
wherein the first drive mechanism is able to rotate the first imaging unit around an optical axis as a center and the second drive mechanism is able to rotate the second imaging unit around an optical axis as a center, and
wherein the control unit controls a rotation angle of at least one of the first imaging unit and the second imaging unit such that a rotation angle of the first imaging unit around the optical axis and a rotation angle of the second imaging unit around the optical axis match with each other in a case in which the switching instruction from the non-composition mode to the composition mode has been acquired.

10. The imaging apparatus according to claim 1, wherein the control unit controls an imaging range of at least one of the first imaging unit and the second imaging unit such that a resolution of the first image and a resolution of the second image match with each other in a case in which the switching instruction from the non-composition mode to the composition mode has been acquired.

11. The imaging apparatus according to claim 1,
wherein the control unit controls at least one of the imaging range of the first imaging unit and the imaging range of the second imaging unit such that a quotient acquired by dividing a size of the imaging range of the first imaging unit by a number of pixels of an imaging device of the first imaging unit matches with a quotient acquired by dividing a size of the imaging range of the second imaging unit by a number of pixels of an imaging device of the second imaging unit in a case in which the switching instruction from the non-composition mode to the composition mode has been acquired.

12. The imaging apparatus according to claim 1, comprising three or more imaging units,
wherein the composition processing unit generates the wide-angle image acquired by imaging around 360 degrees with the imaging apparatus as a center in a case in which an instruction for selecting the composition mode has been acquired.

13. The imaging apparatus according to claim 12, wherein the control unit controls imaging directions of the imaging units such that angles between optical axes of the imaging units are the same in a case in which the switching instruction from the non-composition mode to the composition mode has been acquired.

14. The imaging apparatus according to claim 12, wherein the composition processing unit generates the wide-angle image such that an imaging range in which the subject of interest is included is arranged at the center of the wide-angle image in a case in which the switching instruction from the non-composition mode to the composition mode has been acquired.

15. The imaging apparatus according to claim 12, wherein the control unit controls the imaging range of each of the imaging units such that the imaging range of each of the imaging units becomes a maximum in a case in which the switching instruction from the non-composition mode to the composition mode has been acquired.

16. A non-transitory storage medium on which is stored a computer program for making a computer execute a method for an imaging apparatus,
    wherein the imaging apparatus comprises:
        a first imaging unit and a second imaging unit;
        a first drive mechanism configured to control the first imaging unit;
        a second drive mechanism configured to control the second imaging unit; and
        at least one processor or circuit configured to function as:
            a composition processing unit configured to generate a wide-angle image by compositing a first image acquired by the first imaging unit and a second image acquired by the second imaging unit; and
            an acquiring unit configured to acquire an instruction for selecting a composition mode for generating the wide-angle image or a non-composition mode for individually generating the first image and the second image, and
    wherein the method comprises:
        controlling an imaging range of at least one of the first imaging unit and the second imaging unit so that a subject of interest is not included in an overlapping range of an imaging range of the first imaging unit and an imaging range of the second imaging unit, in a case in which the acquiring unit acquires a switching instruction from the non-composition mode to the composition mode.

17. The imaging apparatus according to claim 4, wherein the acquiring unit acquires information relating to a relative positional relation between the first imaging unit and the second imaging unit.

18. The imaging apparatus according to claim 4, wherein the imaging unit selected by the user out of the first imaging unit or the second imaging unit is used as a reference for generating the wide-angle image.

19. The imaging apparatus according to claim 18, wherein the acquiring unit acquires an instruction for designating a partial area of the imaging range of the imaging unit selected by the user out of the first imaging unit or the second imaging unit.

20. A control method for controlling an imaging apparatus wherein the imaging apparatus comprises:
    a first imaging unit and a second imaging unit;
    a first drive mechanism configured to control the first imaging unit;
    a second drive mechanism configured to control the second imaging unit; and
    at least one processor or circuit configured to function as:
        a composition processing unit configured to generate a wide-angle image by compositing a first image acquired by the first imaging unit and a second image acquired by the second imaging unit; and
        an acquiring unit configured to acquire an instruction for selecting a composition mode for generating the wide-angle image or a non-composition mode for individually generating the first image and the second image,
    wherein the control method comprises:
        controlling an imaging range of at least one of the first imaging unit and the second imaging unit so that a subject of interest is not included in an overlapping range of an imaging range of the first imaging unit and an imaging range of the second imaging unit, in a case in which the acquiring unit acquires a switching instruction from the non-composition mode to the composition mode.

* * * * *